US 9,765,827 B2

(12) United States Patent
Qin

(10) Patent No.: US 9,765,827 B2
(45) Date of Patent: *Sep. 19, 2017

(54) DRY FRICTION CLUTCH FOR A VEHICLE ACCESSORY

(71) Applicant: BorgWarner Inc., Auburn Hills, MI (US)

(72) Inventor: Shiwei Qin, Battle Creek, MI (US)

(73) Assignee: BorgWarner Inc., Auburn Hills, MI (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/886,106

(22) Filed: Oct. 19, 2015

(65) Prior Publication Data

US 2016/0040725 A1    Feb. 11, 2016

Related U.S. Application Data

(62) Division of application No. 14/135,280, filed on Dec. 19, 2013, now Pat. No. 9,482,286.

(Continued)

(51) Int. Cl.
*F16D 13/76* (2006.01)
*F16D 27/112* (2006.01)
(Continued)

(52) U.S. Cl.
CPC ............ *F16D 13/38* (2013.01); *F16D 13/76* (2013.01); *F16D 27/06* (2013.01); *F16D 27/112* (2013.01);
(Continued)

(58) Field of Classification Search
CPC ............ F16D 13/76; F16D 13/38; F16D 27/06
See application file for complete search history.

(56) References Cited

U.S. PATENT DOCUMENTS 2,991,864 A    7/1961  Prachar
5,057,728 A   10/1991  Dammeyer et al.
(Continued)

FOREIGN PATENT DOCUMENTS

CN    201721321 U    1/2011
CN    102085801 A    6/2011
(Continued)

OTHER PUBLICATIONS

Second Office Action issued by Chinese International Patent Office in Application No. 201380065312.4.

*Primary Examiner* — Jacob S Scott
*Assistant Examiner* — Tinh Dang
(74) *Attorney, Agent, or Firm* — Harness, Dickey & Pierce, P.L.C.; John A. Artz PC

(57) ABSTRACT

A fail-safe friction clutch assembly for a vehicle accessory, particularly to drive a vehicle cooling pump, and more particularly as part of a dual mode drive for a cooling pump, together with an electric motor. The friction clutch assembly includes a friction plate member connected to a central rotatable shaft member used for operating the vehicle accessory. A pair of friction lining members are positioned on opposite sides of the friction plate member. An armature member is spring biased to axially force the friction plate member and friction lining member against a housing or cover which is rotating at input speed. A solenoid assembly is used to overcome the spring bias and pull the armature and friction plate member away from the housing.

19 Claims, 4 Drawing Sheets

Related U.S. Application Data

(60) Provisional application No. 61/745,647, filed on Dec. 24, 2012.

(51) Int. Cl.

| | | |
|---|---|---|
| *F16D 27/06* | (2006.01) | |
| *F16D 13/38* | (2006.01) | |
| *F01P 7/08* | (2006.01) | |
| *F16D 27/14* | (2006.01) | |
| *B60K 25/02* | (2006.01) | |

(52) U.S. Cl.
CPC ........ *F16D 27/14* (2013.01); *B60K 2025/022* (2013.01); *F01P 7/084* (2013.01); *Y02T 10/76* (2013.01)

(56) References Cited

U.S. PATENT DOCUMENTS

| | | |
|---|---|---|
| 5,295,812 A | 3/1994 | Steele |
| 5,551,546 A | 9/1996 | Tabayama et al. |
| 5,984,068 A | 11/1999 | Reed, Jr. |
| 6,071,205 A | 6/2000 | Ohno et al. |
| 6,119,841 A | 9/2000 | Orlamunder |
| 6,488,133 B1 | 12/2002 | Maurice et al. |
| 6,561,336 B1 | 5/2003 | Huart et al. |
| 6,868,809 B1 | 3/2005 | Robb |
| 6,974,010 B2 | 12/2005 | Machida et al. |
| RE39,795 E | 8/2007 | Wright |
| 7,267,214 B2 | 9/2007 | Bittner et al. |
| 7,841,456 B2 | 11/2010 | Pescheck et al. |
| 8,256,598 B2 | 9/2012 | Buzzard |
| 8,371,426 B2 | 2/2013 | Hoshino et al. |
| 8,678,152 B2 | 3/2014 | Kuwabara |
| 8,733,527 B2 | 5/2014 | Greene |
| 8,851,258 B2 | 10/2014 | Komorowski et al. |
| 8,978,600 B2 | 3/2015 | Shutty et al. |
| 9,004,251 B2 | 4/2015 | Ikegawa |
| 9,140,313 B2 | 9/2015 | Ikegawa |
| 9,217,476 B2 | 12/2015 | Roby |
| 9,279,460 B2 | 3/2016 | Qin |
| 9,447,826 B2 * | 9/2016 | Qin ................... F16D 13/76 |
| 2002/0108588 A1 | 8/2002 | Komorowski |
| 2003/0008741 A1 | 1/2003 | Fadler et al. |
| 2003/0029392 A1 | 2/2003 | Komorowski |
| 2003/0029393 A1 | 2/2003 | Komorowski |
| 2007/0227853 A1 | 10/2007 | Pardee |
| 2009/0047162 A1 | 2/2009 | Uchikado et al. |
| 2009/0272615 A1 | 11/2009 | Buzzard |
| 2010/0126822 A1 | 5/2010 | Winkler et al. |
| 2012/0133465 A1 | 5/2012 | Staniewicz et al. |
| 2013/0075219 A1 | 3/2013 | Onitake et al. |
| 2013/0093547 A1 | 4/2013 | Staniewicz et al. |
| 2013/0098730 A1 | 4/2013 | Danciu et al. |
| 2013/0175134 A1 | 7/2013 | Boyes et al. |
| 2013/0187736 A1 | 7/2013 | Staniewicz et al. |
| 2013/0306005 A1 | 11/2013 | Shutty et al. |
| 2013/0313068 A1 | 11/2013 | Mevissen et al. |
| 2014/0023526 A1 | 1/2014 | Roby |
| 2014/0076683 A1 | 3/2014 | Williams |
| 2014/0141892 A1 | 5/2014 | Williams |
| 2014/0174873 A1 | 6/2014 | Qin |
| 2014/0174874 A1 | 6/2014 | Qin |
| 2014/0238809 A1 | 8/2014 | Boyes et al. |
| 2015/0075935 A1 | 3/2015 | Kitayama et al. |
| 2015/0184575 A1 | 7/2015 | Shutty et al. |
| 2015/0285365 A1 | 10/2015 | Canto Michelotti |
| 2016/0040733 A1 | 2/2016 | Staniewicz et al. |

FOREIGN PATENT DOCUMENTS

| | | |
|---|---|---|
| CN | 102459941 A | 5/2012 |
| WO | WO-2012/142016 A2 | 10/2012 |

\* cited by examiner

DRY FRICTION CLUTCH FOR A VEHICLE ACCESSORY

CROSS REFERENCE TO RELATED APPLICATIONS

This application claims the benefit of U.S. Provisional Application Ser. No. 61/745,647 filed on Dec. 24, 2012.

TECHNICAL FIELD

Friction clutch assemblies, particularly for vehicle accessories, such as hybrid coolant pumps, are disclosed.

BACKGROUND

Water pumps are used in water cooled engines, primarily for operation of vehicles such as automobiles and trucks with internal combustion engines. The water pumps are typically driven by a belt attached to the crankshaft of the engine and thus operate at some percentage of engine speed. The pumps have an impeller that is used to circulate the engine coolant from the engine to the radiator and back in order to keep the coolant within acceptable temperature limits.

Efforts are being made today to reduce the power consumption of engine accessories, such as water pumps, in order to improve fuel economy and reduce emissions. It would thus be preferable if such accessories, including water pumps, could be made to operate at variable speeds or with less power in order to reduce the load on the engine and, in turn, improve fuel economy and reduce undesirable emissions from the engine.

SUMMARY OF THE INVENTION

In one form, the present teachings provide a vehicle accessory that includes a solenoid housing, an electromagnetic coil, a shaft, a first bearing, an input member, a second bearing, a cover member, an armature and a friction plate. The solenoid housing defines a first annular channel, a second annular channel and a tubular portion having a bore formed therethrough. The electromagnetic coil is received in the first annular channel. The shaft is received in the bore. The first bearing is received in the bore and supports the shaft for rotation about an axis relative to the tubular portion. The input member has a hub, an outer rim and an annular web that couples the hub to the outer rim. The hub is received in the second annular channel in the solenoid housing. The outer rim extends in two directions along the axis beyond the web such that a first portion of the outer rim is disposed radially in-line with at least a portion of the electromagnetic coil. The second bearing is in the second annular channel and supports the input member for rotation about the axis relative to the tubular portion. The cover member is coupled to the input member for common rotation about the axis and cooperates with the input member to define a clutch cavity. The armature is received in the clutch cavity and is coupled for rotation with the input member. The armature is movable along the axis between a first armature position and a second armature position. The friction plate is non-rotatably coupled to the shaft. Positioning of the armature in the first armature position couples the friction plate to the input member for common rotation. Positioning of the armature in the second armature position decouples the friction plate from the input member. The electromagnetic coil is selectively operated to cause movement of the armature along the axis.

Further objects, features and benefits of the invention are set forth below in the following description of the invention when viewed in combination with the drawings and claims.

DESCRIPTION OF THE PREFERRED EMBODIMENTS

Figure 1:
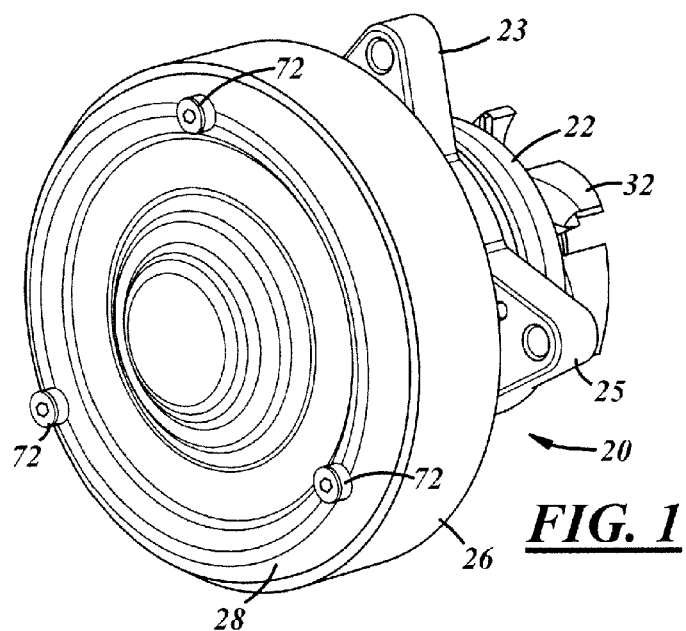
FIG. 1 is a perspective view of a vehicle water pump assembly which can incorporate the present invention.

For the purpose of promoting and understanding the principles of the present invention, reference will now be made to the embodiments illustrated in the drawings and specific language will be used to describe them. It will nevertheless be understood that no limitation as to the scope of the invention is hereby intended. The invention includes any alternatives and other modifications in the illustrated devices and described methods and further applications of the principles of the invention which would normally occur to persons or ordinary skill in the art to which the invention relates.

The present inventions described herein relate to friction clutch assemblies particularly used for coolant pumps which circulate the coolant in an engine, such as an automobile internal combustion engine. (The terms "water pump" and "coolant pump" are used interchangeably herein.) The present invention, however, can also be used for other engine accessory devices.

The preferred embodiment of the present invention as described herein is particularly adapted for use with trucks, passenger cars and off-highway vehicles, and will be described with respect to its use in a dual mode coolant pump. In accordance with a preferred embodiment, the electric motor is a brushless DC (BLDC) motor. For the mechanical mode of operation, the water pump is driven by an engine belt, such as a serpentine accessory belt, attached to the crankshaft of the engine.

As a dual mode coolant pump, the pump is electrically driven under most conditions. However, it also can be mechanically engaged where more cooling is required. Thus, when the vehicle is being driven under most normal conditions, the water pump is being driven and operated by the electric motor.

During "worst case" cooling conditions, such as when the vehicle is heavily loaded, when it is pulling a trailer, or when it is going up hill in the summertime, etc., the water pump is adapted to be mechanically driven by the belt directly from the engine. This provides the necessary cooling under such circumstances. In some circumstances, it may be necessary or possible to perform both modes of operation.

A hybrid (dual mode) water pump embodiment with a friction clutch assembly in accordance with the present invention is shown in FIGS. 1-5 and referred to generally by the reference numeral 20. The hybrid water pump includes a motor housing 22, a solenoid housing 24, a pulley member 26 and a cover member 28. A central shaft member 30 is rotated by the pump 20 which operates the water pump impeller 32. As shown, the pulley member has a smooth outer surface 27 on which an engine belt (not shown) is positioned. The outer surface of the pulley member could also comprise circumferential grooves for mating with an engine belt with corresponding grooves.

Figure 2:
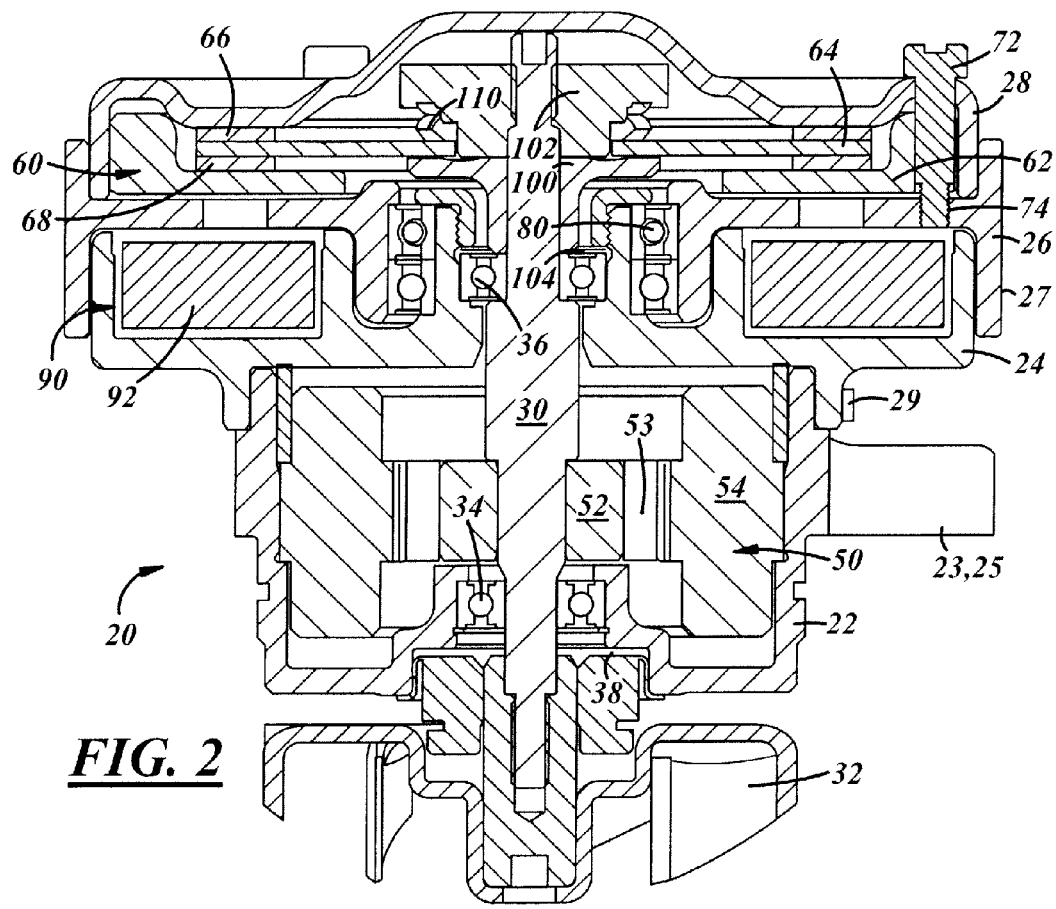
FIG. 2 is a cross-sectional view of the assembly shown in FIG. 1 and featuring an embodiment of the present invention.
Figure 3A:
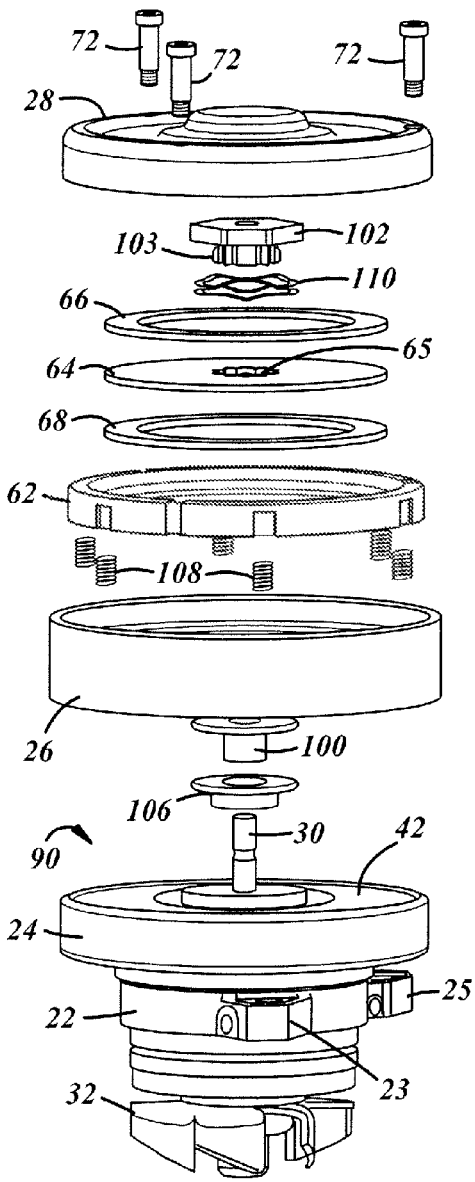
FIG. 3A and 3B are exploded views of the components of the assembly as shown in FIG. 2.
Figure 3B:
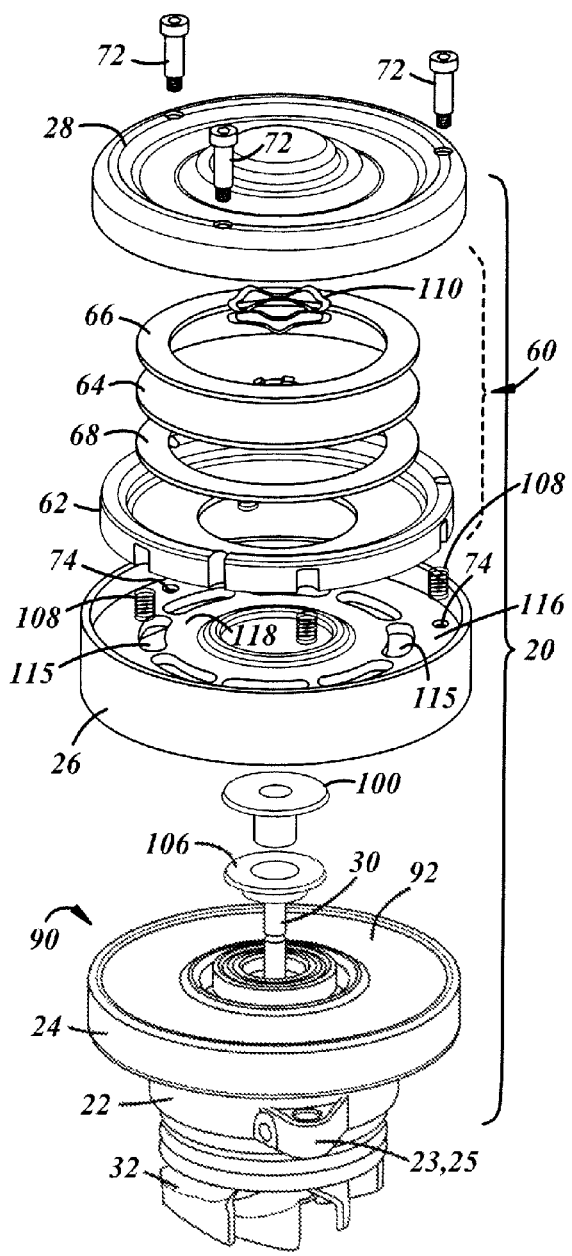
Figure 4:
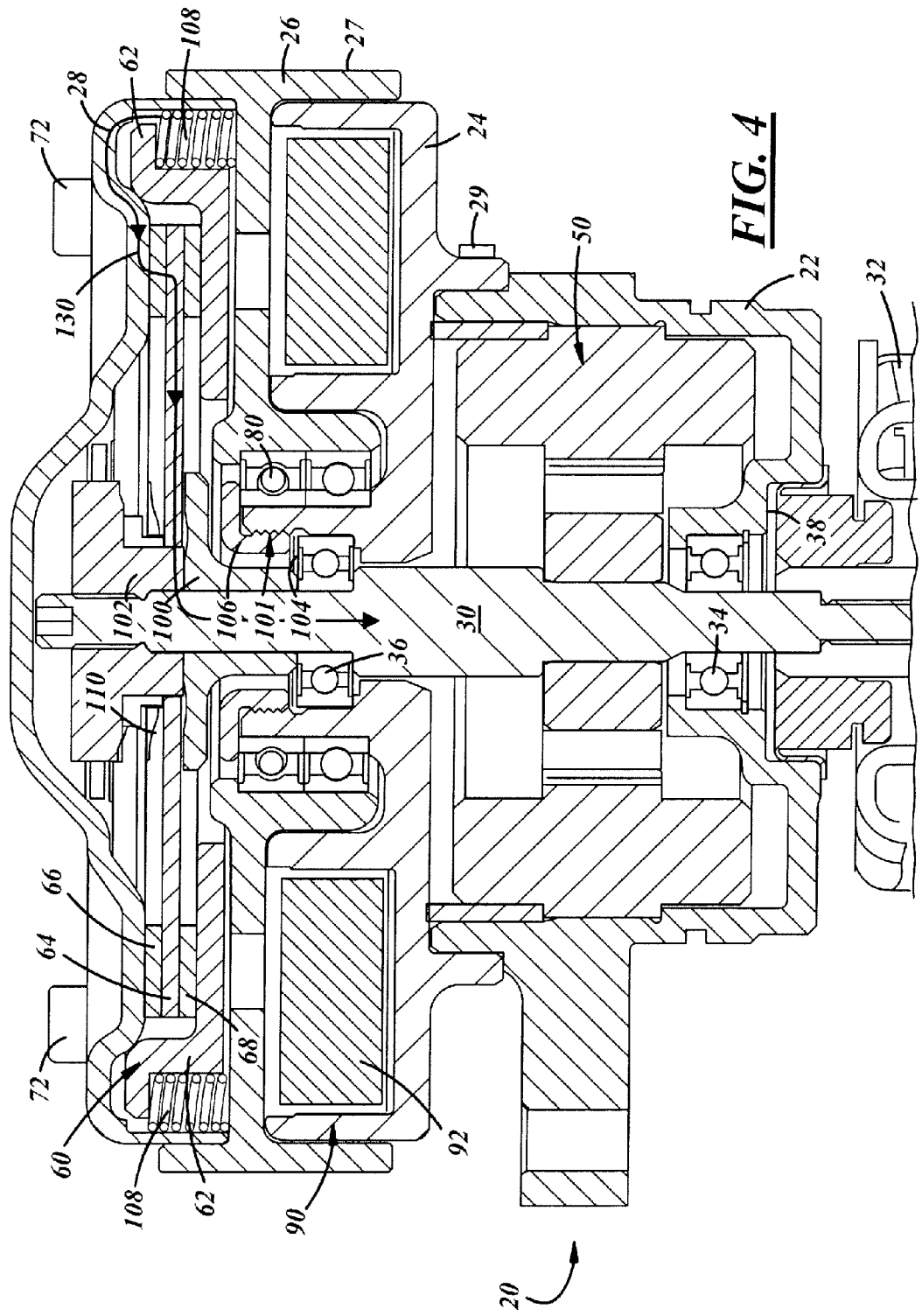
FIG. 4 is an enlarged cross-sectional view of the assembly shown in FIGS. 2-3 with the components shown in the solenoid disengaged position.
Figure 5:
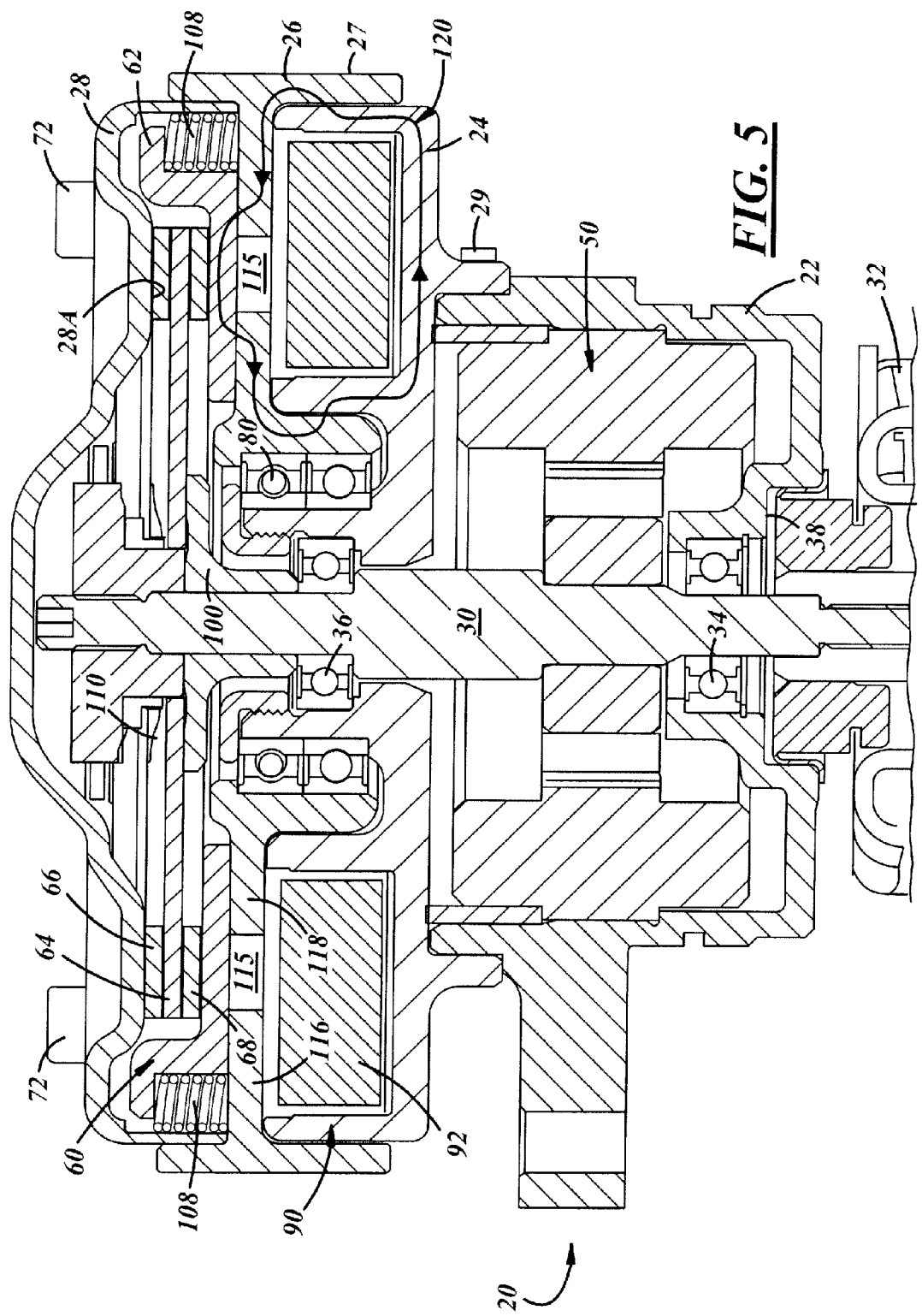
FIG. 5 is an enlarged cross-sectional view of the assembly shown in FIGS. 2-3 with the components shown in the solenoid engaged position.

A cross-sectional view of the water pump assembly 20 is shown in FIG. 2 and an exploded view of the components of the water pump assembly 20 is shown in FIG. 3. Enlarged views showing the friction clutch mechanism in the deactivated and activated modes of operation are shown in FIGS. 4 and 5.

The water pump assembly has an impeller shaft 30 which is positioned within the assembly and is attached to a water pump impeller 32. The impeller shaft 30 is held in place in the multi-component assembly by bearings 34 and 36. A coolant seal 38 is used to prevent coolant in the pump from leaking into the motor housing.

A motor 50 is positioned inside the motor housing 22. The motor 50 includes a rotor carrier 52, magnets 53, and a stator 54. Magnets 53 are bonded to the rotor carrier 52 and together form the rotor of the motor. The motor 50 is preferably a brushless DC (BLDC) electric motor. The rotor 52 is securely attached, e. g. press fitted, to the shaft 30, which causes the shaft, and thus the impeller 32, to rotate when the motor 50 is operated. Electricity to the motor 50 is supplied by an electrical source (not shown).

The motor housing 22 has a plurality of mounts, only two of which 23, 25, are shown in the drawings. The mounts have openings for attachment of the water pump assembly 20 inside the engine compartment of a vehicle.

The friction clutch assembly is designated generally by the reference numeral 60. The friction clutch assembly generally comprises an armature plate 62, a friction plate 64, and two annular rings of friction material 66 and 68. The armature plate 62 is preferably made of a magnetic metal material, such as low carbon steel. The friction plate 64 is preferably made of a non-magnetic material, such as stainless steel. The friction material 66 and 68 can be any conventional friction materials used in friction clutches today, and can be complete rings, segments of rings, or simply pieces of friction material positioned generally where rings 66 and 68 are positioned in the drawings. Preferably, the friction materials 66, 68 are bonded to the friction plate 64 using a bonding agent.

The cover member 28 which preferably is made of a non-magnetic material, such as stainless steel, is connected directly to the pulley member 26 by a plurality of connecting pin members, such as fasteners or bolts 72. The ends of the fasteners can be threaded (as shown particularly in FIG. 2) for mating with corresponding mating threads in openings 74 in the pulley member 26. Thus, when the pulley is rotated by an engine belt (not shown); the cover member 28 rotates at the same input speed.

The pulley member 26 is preferably made of a magnetic metal material, such as low carbon steel. The pulley member rotates freely around bearings 80. Although the bearings can be of any type that will have sufficient durability and performance, a pair of stacked bearings can be utilized, as shown in the drawings.

The operation of the friction clutch assembly is performed by a solenoid assembly 90. The solenoid assembly includes a solenoid coil 92 which is positioned in the solenoid housing 24. The solenoid coil member comprises a donut-shaped coil of copper wires, while the solenoid housing is preferably made of a magnetic material, such as low carbon steel. The solenoid coil member 92 is potted in the solenoid housing 24.

The solenoid housing 24 is independently positioned in the water pump assembly by use of bearing 36. The bearing 36 allows the shaft member 30 to rotate freely relative to the solenoid housing 24.

The solenoid housing 24 is connected directly to the motor housing 22 by, for example, a press fit and/or a series of fastener members 29. In production, several different ways can be used to anchor or fix the solenoid housing 24 to the motor housing 22.

The nut member 102 is threaded, or otherwise firmly fixed, on the end of the shaft member 30. The friction plate member 64 is connected, such as being keyed, to the nut member 102. As shown in FIG. 3A, the nut member has a plurality of spline members 103 which fit within corresponding notches 65 in the center of the friction plate member 64. In this manner, the nut and friction plate members rotate with the shaft member 30. The nut member 102 and the shaft member 30 firmly clamp the stop member 100 and the bearing member 36 together. The shaft member 30 and all components fixed on it are positioned axially by the bearing member 36. The stop member 100 is preferably made of a non-magnetic material, such as stainless steel.

To fix the bearing member 36 in an axial position inside the solenoid housing 24, a wave spring member 104 and bearing retainer member 106 are utilized. The bearing retainer member 106 is threadedly affixed to the solenoid housing as shown by reference number 101 (see FIG. 4).

The stop member 100 is utilized to stop the axial movement of the friction plate member 64 when the solenoid assembly 90 is energized, as explained below. A return spring 110 is positioned between the nut member 102 and the friction plate member 64 and acts to return the friction plate member 64 to its mechanical disengaged position when the solenoid assembly 90 is actuated.

As indicated, the water pump impeller 32 is normally driven by the electric motor 50. The electric motor and the solenoid coil are electrically powered through a circuit board (not shown). Electrical leads and wires can be insert molded in the motor housing 22 in order to carry the electrical signals to the electric motor 50 and solenoid coil member 92. The circuit board further communicates with the electronic control unit (ECU) of the vehicle through the vehicle communication network such as a CAN network. The water pump assembly controller circuit board could also be positioned inside the motor housing 22 possibly having a donut shape.

The speed of the motor and thus the water pump is selected according to the cooling required for the engine. Sensors feed relevant data to the ECU which then sends a signal to the pump controller requesting the desired speed. The pump controller then determines whether the desired speed is best achieved using the electric motor or by engaging the friction clutch and driving the impeller directly from the pulley.

When the water pump is being driven solely by the electric motor 50, the friction clutch assembly is held in a disengaged position by the solenoid assembly 90. This is shown in FIG. 5. When the solenoid coil member 92 is electrically activated, a flux circuit 120 is created which acts to pull the armature plate 62 toward the solenoid coil member overcoming the force of the coil spring members 108. With the armature plate 62 pulled toward the solenoid, the return spring 110 holds the friction plate 64 against the stop member 100. In this condition, the friction materials on the friction plate 64 are not in contact with either the cover member 28 or the armature plate 62.

The number of coil springs 108 and their biasing force is determined according to the force needed in the assembly. Six coil springs 108 are shown in the drawings, but there can be more or less than this amount depending on the force needed.

In this electrical mode of operation, there are air gaps on both sides of the friction materials on the friction plate, and the input (pulley member) and output (shaft member) are completely disconnected. This eliminates any interaction, such as bearing drag between the input and output.

In order to create an appropriate flux circuit 120, the pulley member 26 has a plurality of openings 115 which create air gaps. The openings 115 essentially form an annular open ring. With the air gaps, the pulley member is for electromagnetic purposes, essentially an outer annular ring 116 and a separated annular inner ring 118. (This is best shown in FIG. 3B.)

The flux circuit 120 is shown in FIG. 5. It runs through the solenoid housing 24, the belt engaging portion of the pulley member 26, outer annular ring portion of the pulley member 26, and then jumps to the armature plate member 62 and then back to the inner annular ring portion of the pulley member 26 where it returns to the solenoid housing. This circuit pulls the armature member tightly to the pulley member such that the armature member rotates with the pulley member and at the same speed.

FIG. 4 depicts the situation where the solenoid assembly 90 is not activated. This causes the water pump to be driven mechanically by an engine belt and the electric motor 50 can be turned off. In this situation, coil springs 108 force the armature member 62 in a direction away from the pulley member and away from the solenoid assembly. This causes the armature member 62 to contact the friction member 68 which in turn forces the friction member 66 to contact the inner surface 28A of the cover member 28. Since the armature member, pulley member and cover member are all fixed together, this causes the shaft member 30 to rotate at the same speed.

A path of torque transfer which mechanically rotates the shaft member is shown by arrows 130 in FIG. 4. In the engaged clutch, the friction plate member is clamped between the cover member and armature member and torque is transferred through both sides of the friction plate. There also is a torque transfer path from the pulley member 26, through the fastener 72, the armature plate member 62, the friction plate member 64, the nut member 100 and to the shaft 30.

It is common in automotive accessories such as air conditioning compressors, pumps, etc. to use spring engaged, electromagnetically disengaged clutches to selectively turn on and off the drive to the accessory component. This is typically done to conserve energy when the device is not needed. These devices are typically designed to be spring engaged so the accessory device is powered in the event of a control failure such as a loss of electrical power. This is done to provide "Fail-Safe" functionality meaning that the device defaults to its "on" state when it is unpowered.

As indicated above, the present invention provides a "fail-safe" friction clutch design. If the electrical system of the coolant pump were to fail, the solenoid would be de-energized allowing the coil springs to force the friction clutch assembly to become engaged. Therefore the pump would operate in mechanical mode with the impeller driven by the pulley member through the clutch assembly, thus preventing overheating.

Although the invention has been described with respect to preferred embodiments, it is to be also understood that it is not to be so limited since changes and modifications can be made therein which are within the full scope of this invention as detailed by the following claims.

What is claimed is:

1. A vehicle accessory comprising:
   a solenoid housing that defines a first annular channel, a second annular channel and a tubular portion having a bore formed therethrough;
   an electromagnetic coil received in the first annular channel;
   a shaft received in the bore;
   a first bearing received in the bore and supporting the shaft for rotation about an axis relative to the tubular portion;
   an input member having a hub, an outer rim and an annular web that couples the hub to the outer rim, the hub being received in the second annular channel in the solenoid housing, the outer rim extending in two directions along the axis beyond the web, wherein a first portion of the outer rim is disposed radially in-line with at least a portion of the electromagnetic coil;
   a second bearing received in the second annular channel and supporting the input member for rotation about the axis relative to the tubular portion;
   a cover member that is coupled to the input member for common rotation about the axis, wherein a clutch cavity is delimited by the cover member and the input member;
   an armature received in the clutch cavity and coupled for rotation with the input member, the armature being movable along the axis between a first armature position and a second armature position;
   a friction plate that is non-rotatably coupled to the shaft;
   wherein positioning of the armature in the first armature position couples the friction plate to the input member for common rotation, wherein positioning of the armature in the second armature position decouples the friction plate from the input member, and wherein the electromagnetic coil is selectively operable to cause movement of the armature along the axis.

2. The vehicle accessory of claim 1, further comprising a return spring for biasing at least one of the armature and the friction plate along the axis in a predetermined direction.

3. The vehicle accessory of claim 2, wherein the return spring acts through the friction plate to urge the armature toward the second armature position.

4. The vehicle accessory of claim 1, wherein the friction plate frictionally engages the cover member when the armature is in the first armature position.

5. The vehicle accessory of claim 1, wherein the friction plate comprises a plate member and a first friction element that is coupled to the plate member, the first friction element being configured to engage one of the armature and the cover member.

6. The vehicle accessory of claim 5, wherein the friction plate further comprises a second friction element that is coupled to the plate member, the second friction element being configured to engage the other one of the armature and the cover member.

7. The vehicle accessory of claim 5, wherein the first friction element is disposed about a circumference of the friction plate member.

8. The vehicle accessory of claim 7, wherein the first friction element extends in a continuous manner about the circumference of the friction plate member.

9. The vehicle accessory of claim 1, further comprising an electric motor, the electric motor having a rotor that is coupled to the shaft for common rotation.

10. The vehicle accessory of claim 9, wherein the electric motor is housed in a motor housing, the motor housing being mounted to the solenoid on a side of the solenoid housing opposite the input member.

11. The vehicle accessory of claim 9, wherein a fluid flow causing rotor is fixedly coupled to the shaft.

12. The vehicle accessory of claim 11, wherein the fluid flow causing rotor is an impeller.

13. The vehicle accessory of claim 1, wherein a fluid flow causing rotor is fixedly coupled to the shaft.

14. The vehicle accessory of claim 13, wherein the fluid flow causing rotor is an impeller.

15. The vehicle accessory of claim 1, wherein a plurality of cylinders are mounted to the input member and wherein the armature is slidably received on the cylinders.

16. The vehicle accessory of claim 15, wherein the cylinders are fasteners that secure the cover member to the input member.

17. The vehicle accessory of claim 16, wherein the fasteners are threaded fasteners.

18. The vehicle accessory of claim 1, wherein the input member is a pulley.

19. The vehicle accessory of claim 1, further comprising a bearing retainer that is threaded to the tubular portion, the bearing retainer being configured to exert an axially-directed load on at least one of the first and second bearings.

* * * * *